(12) United States Patent
Dodds et al.

(10) Patent No.: US 11,429,523 B2
(45) Date of Patent: Aug. 30, 2022

(54) TWO-WAY INTERLEAVING IN A THREE-RANK ENVIRONMENT

(71) Applicant: Microsoft Technology Licensing, LLC, Redmond, WA (US)

(72) Inventors: Brett Kenneth Dodds, Boise, ID (US); Monish Shantilal Shah, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 24 days.

(21) Appl. No.: 16/874,998

(22) Filed: May 15, 2020

(65) Prior Publication Data
US 2021/0357321 A1 Nov. 18, 2021

(51) Int. Cl.
*G06F 12/06* (2006.01)
*G06F 9/4401* (2018.01)
*G06F 12/02* (2006.01)
*G06F 12/0811* (2016.01)
*G06F 13/16* (2006.01)

(52) U.S. Cl.
CPC ........ *G06F 12/0607* (2013.01); *G06F 9/4406* (2013.01); *G06F 12/0246* (2013.01); *G06F 12/0811* (2013.01); *G06F 13/1668* (2013.01)

(58) Field of Classification Search
CPC ............. G06F 12/0607; G06F 12/0246; G06F 12/081; G06F 12/01; G06F 9/4406; G06F 13/1668
See application file for complete search history.

(56) References Cited

U.S. PATENT DOCUMENTS

| | | | |
|---|---|---|---|
| 7,346,750 B2 | 3/2008 | Ishikawa | |
| 8,819,359 B2 | 8/2014 | Kapil et al. | |
| 10,013,341 B2 | 7/2018 | Kwon et al. | |
| 10,140,223 B2 | 11/2018 | Chun | |
| 2001/0042174 A1 | 11/2001 | Gupta et al. | |
| 2006/0095694 A1* | 5/2006 | Hsieh | G06F 12/0607 |
| | | | 711/157 |

(Continued)

OTHER PUBLICATIONS

Wong, Adrian; "Rank Interleave—The BIOS Optimization Guide"; retrieved at https://www.techarp.com/bios-guide/rank-interleave/on Apr. 9, 2022; publication date of Oct. 23, 2016; (Year: 2016).*

(Continued)

*Primary Examiner* — Prasith Thammavong

(57) ABSTRACT

A memory controller maintains a mapping of target ranges in system memory space interleaved two-ways across locations in a three-rank environment. For each range of the target ranges, the mapping comprises a two-way interleaving of the range across two ranks of the three-rank environment and offsets from base locations in the two ranks. At least one of the ranges has offsets that differ relative to each other. Such offsets allow the three ranks to be fully interleaved, two ways. An instruction to read data at a rank-agnostic location in the diverse-offset range causes the memory controller to map the rank-agnostic location to two interleaved locations offset different amounts from their respective base locations in their ranks. The controller may then affect the transfer of the data at the two interleaved locations.

19 Claims, 5 Drawing Sheets

(56) References Cited

U.S. PATENT DOCUMENTS

| | | |
|---|---|---|
| 2007/0022261 A1 | 1/2007 | Young |
| 2009/0119478 A1* | 5/2009 | Allison .............. G06F 12/0292 |
| | | 711/217 |
| 2010/0274960 A1 | 10/2010 | Lee et al. |
| 2016/0179374 A1 | 6/2016 | Berke |
| 2016/0306567 A1* | 10/2016 | Yang ................... G06F 12/023 |
| 2017/0371812 A1* | 12/2017 | Chun ................... G06F 3/0613 |
| 2018/0059950 A1* | 3/2018 | Gupta ................. G06F 3/0619 |
| 2018/0095691 A1* | 4/2018 | Manvar .............. G06F 13/1694 |

OTHER PUBLICATIONS

"International Search Report and Written Opinion Issued in PCT Application No. PCT/US2021/022274", dated Jul. 5, 2021, 12 Pages.

"Fujitsu Primergy Servers Memory Performance of XEON E5-2600/4600 (Sandy Bridge-EP) Based Systems", In White Paper of Fujitsu, Dec. 7, 2012, 19 Pages.

Colglazier, et al., "Maximizing System x and ThinkServer Performance with a Balanced Memory Configuration", Retrieved from: https://lenovopress.com/lp0501.pdf, Oct. 4, 2017, 19 Pages.

* cited by examiner

ID
TWO-WAY INTERLEAVING IN A THREE-RANK ENVIRONMENT

TECHNICAL FIELD

Aspects of the disclosure are related to the field of computing hardware, software, and firmware, and in particular, to enhanced memory interleaving.

BACKGROUND

Memory interleaving is a technique by which contiguous data is staggered across multiple physical resources so as to increase bandwidth. The physical resources used to provide system memory in a computer require a certain amount of time between read/write operations. This fact causes a bottleneck when contiguous data is stored sequentially on a single physical resource because the processor has to wait a period of time after accessing the resource before accessing it again. Interleaving solves this problem by spreading out contiguous blocks of data across two or more physical resources so that the resources can be accessed at a speed that more closely matches that of the channels to and from the processor.

Ranks are the logical divisions of physical resources across which data may be interleaved in a given environment, while n-way interleaving refers to the number of ranks being interleaved in a configuration. For example, two-way interleaving describes a technique whereby contiguous blocks of data are interleaved across two ranks in a staggered manner, whereas four-way interleaving would interleave the data across four ranks. Two-way (or four-way) interleaving therefore scales-up very well in environments that have a quantity of ranks equal to a power-of-two number (i.e. $2^X$) such as those with 2 ranks, 4 ranks, 8 ranks, and so on.

Two-way interleaving benefits "power-of-two" rank environments because the rank-agnostic addresses in memory system space map seamlessly to the rank-aware address space of the physical memory resources. As an example, two contiguous locations in memory system space (e.g. rank-agnostic addresses j and k in a range) would map directly to the same location on two different physical memory resources (e.g. rank-aware addresses $\alpha 1$ and $\alpha 2$, where 1 and 2 denote the different physical resources and a represents the location on each resource). This allows data to be interleaved by way of a simple mapping between address spaces and it allows all of the system memory to be interleaved.

Two-way interleaving in three-rank environments (e.g. those with 3, 6, 9, 12 or more physical memory resources) is less efficient because one of three regions in memory space cannot be interleaved. To illustrate, assume that system memory is divided into three address ranges and that the physical memory resources include three ranks. Two-way interleaving would map the first of three ranges to the first half of each of two ranks; the second range to the second half of each of the same two ranks; and the third range to the entirety of the third rank. In other words, the data in the third range of addresses would not be interleaved, thereby limiting the effectiveness of two-way interleaving in a three-rank environment.

The limitations of two-way interleaving in three-rank environments has the practical consequence of increasing system costs unnecessarily. Take for example a server configuration with three ranks of 16 GB memory or 48 GB total. 32 GB of the 48 GB can be interleaved two ways, while the remaining 16 GB cannot be interleaved. The memory could be increased to 64 GB, thereby allowing the entirety of the memory to be interleaved, but at the considerable expense of adding a fourth memory module.

BRIEF SUMMARY

Technology for performing two-way interleaving in a three-rank environment as disclosed herein eliminates or mitigates the inefficiencies of prior techniques. In various implementations, a memory controller loads a mapping of target ranges in system memory space interleaved two-ways across locations in a three-rank environment. For each range of the target ranges, the mapping comprises a two-way interleaving of the range across two ranks of the three-rank environment and offsets from base locations in the two ranks.

At least one of the ranges has offsets that differ relative to each other, meaning that data allocated to that range is interleaved at different positions in their respective ranks. Such non-uniform offsets allow the three ranks to be fully interleaved, two ways. An instruction to read data at a rank-agnostic location in the diverse-offset range causes the memory controller to map the rank-agnostic location to two interleaved locations offset different amounts from their respective base locations in their ranks. The controller may then affect the transfer of the data at the two interleaved locations.

This Brief Summary is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Techniques for performing two-way interleaving in three-rank environments are disclosed herein. In various implementations, a unique mapping of system memory space to memory module space allows all of the ranks in a three-rank environment to have interleaved data stored thereon. Such an advance allows computing devices (e.g. server computers) to be configured with 3n ranks of memory to better match their workloads, while still benefiting from the advantages of two-way interleaving.

Figure 1:
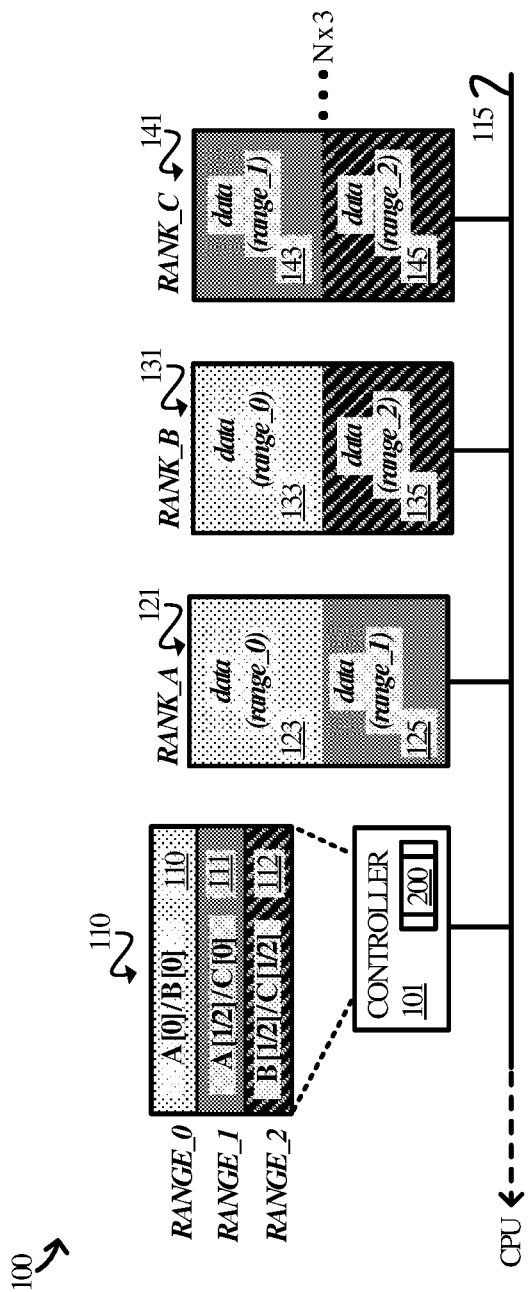
FIG. 1 illustrates an operational architecture in an implementation of two-way interleaving in three-rank environments.

FIG. 1 illustrates an operational architecture 100 for implementing two-way interleaving in a three-rank environment. Operational architecture 100 includes a controller 101 and three ranks of memory represented by rank 121 (rank_a), rank 131 (rank_b), and rank 141 (rank_c). Ranks 121, 131, and 141 are connected to bus 115, as is controller 101. Bus 115 is representative of one or more buses over which data and control signals flow to and from the memory represented by ranks 121, 131, and 141.

Ranks 121, 131, and 141 each comprises a set of memory devices that operate in unison, examples of which include dynamic random-access memory (DRAM) devices and any other type of memory device. Controller 101 comprises a digital circuit that manages the flow of data going to and from the memory represented by ranks 121, 131, and 141. Controller 101 may be integrated as part of a microprocessor (e.g. the central processing unit) or may be implemented separately.

Controller 101 maintains a mapping 110 of rank-agnostic memory space to rank-aware memory space. The rank-agnostic memory space comprises the address space understood by the central processor when requesting to read and write data. The rank-aware memory space comprises the address space that describes the actual physical locations on the memory devices where read/write operations are affected. The parameters of mapping 110 may be loaded into controller 101 from a basic input/output system (BIOS) upon power-up, although mapping 110 could be statically maintained in some implementations or provided from some other source. Mapping 110 may be a file, a list, and array, or any suitable data structure. It may be appreciated that mapping 110 in FIG. 1 is merely an exemplary visualization to illustrate the relationship of memory-space addresses to physical locations.

It is assumed for exemplary purposes that mapping 110 describes a two-way interleaving of three ranges of addresses in memory space to the three-ranks in operational architecture 100. The three ranges are represented by range 110 (range_0), range 111 (range_1), and range 112 (range_2). Each range is illustrated with a different fill pattern that distinguishes one range from another. It may be appreciated that the concepts disclosed herein apply as well to four-way interleaving. In addition, the concepts disclosed herein can be applied with respect to three-rank environments having any 3n number of ranks (e.g. 3, 6, 9, 12, and so on).

Each range also includes two rank identifiers and their respective offsets from their corresponding base address in the ranks. For example, data allocated to addresses in range 110 is interleaved between rank 121 and rank 131. In addition, the offsets used to access ranks 121 and 131 are the same: zero. Data allocated to addresses in range 112 is interleaved between rank 121 and rank 131 and their offsets are also the same with respect to each other: one-half the size of each rank. However, the offsets used to access rank 121 and rank 141 for purposes of interleaving data allocated to range 111 differ with respect to each other. That is, the offset for rank 121 comprises one-half the size of rank 121, whereas the offset for rank 141 comprises zero. The different offsets for the interleaving of data allocated to range_b make it possible to fully interleave data in a two-way manner across the three ranks.

The same fill patterns used to distinguish each address range in mapping 110 are also used to illustrate the logical subdivisions of each rank that map to the different ranges. For example, a first subdivision 123 of rank 121 maps to range 110, while a second subdivision 125 of rank 121 maps to range 111. A first subdivision 133 of rank 131 maps to range 110 and a second subdivision 135 of rank 131 maps to range 111. Lastly, a first subdivision 143 of rank 141 maps to range 111 and a second subdivision 145 maps to range 112. The first and section subdivision of each rank may be equally sized with respect to each other and with respect to the other subdivision of the other ranks. Similarly, each of the ranges 110, 111, and 112 in memory space may be equally sized.

Controller 101 manages the flow of data in accordance with interleaving process 200. The logic of interleaving process 200, illustrated in FIG. 2, may be implemented in the hardware and/or firmware of controller 101. The logic directs controller 101 to operate as described for interleaving process 200, referring parenthetically to the steps in FIG. 2.

In operation, controller 101 generates mapping 101 upon start-up (step 201). Generating mapping 101 may include controller 101 obtaining parameters from BIOS or elsewhere that specify the type of interleaving (e.g. 2-way, 4-way) and the number of ranks (e.g. 3, 6, 8, etc.). Controller 101 then maps system memory space to physical memory space based on the type of interleaving and number of ranks specified in BIOS. This includes determining for each range of addresses in memory system space the ranks to which a given address range is mapped and the offsets into the ranks.

Controller 101 determines the offsets based at least partly on the combination of interleaving type and the number of ranks. Two-way (or four-way) interleaving in in a power-of-two number of ranks results in offset pairs that match each other for each range of addresses mapped to a given pair of ranks. The offset pair for a given range need not be the same as any other offset pair for any other range, although the offset values within a given pair will match.

In contrast, two-way (or four-way) interleaving in a 3n-number of ranks results in at least one range that maps to two ranks at different offsets with respect to each other. That is, the offset into one rank for a given address range will differ from the offset into a second range for the same address range. It may be appreciated then that controller 101 calculates the offsets differently depending upon the combination of interleaving type and rank quantity. Such logic may be implemented in hardware or firmware in the context of controller 101.

As an example, two-way interleaving across three, six, nine, or twelve ranks (or other non-power of two quantities) would result in the same offsets into two-thirds of the rank pairs, but different offsets into one-third of the rank pairs. The size of each rank may also factor into the offset calculations. For instance, a one-half offset into 16 GB ranks would start at 8 GB, while the same offset into 32 GB ranks would start at 16 GB.

In other implementations, the parameters may specify the offsets as discrete items of information, in addition to the interleaving type. For example, the BIOS could initialize controller 101 with parameters indicative of the type of interleaving, the number of ranks, the size of each rank, and the offsets into the ranks. Alternatively, the BIOS could initialize controller 101 with the actual offset locations rather than providing the offset values. In either case, controller 101 may populate mapping 110 with an indication of the ranks mapped to each address range, as well as the offsets into the ranges, whether by offset values or locations.

In some implementations, controller 101 may calculate the offset locations a-priori using the offsets in the parameters, in which case mapping 110 could indicate a direct correspondence between address ranges and offset locations in the ranks. In other implementations, controller 101 may populate mapping 110 with the rank identifiers corresponding to the ranges, as well as the offsets as separate, discrete items of information. Controller 101 would then calculate the offset locations at run-time after having accessed mapping 110. Other mechanisms for affecting the offsets are possible and may be considered within the scope of the present disclosure.

Next, controller 101 receives an instruction to access a rank-agnostic location in system memory space (step 203). The instruction may comprise one or more suitable instructions such as load/store commands that correspond to read/write operations and that cause data to be read from or written to memory. The instruction identifies the location in memory space to be accessed for purposes of read/write operations and may be identified by a single address, multiple addresses, a range of addresses, or the like.

Controller 101 responsively accesses its mapping 110 of rank-agnostic locations to rank-aware locations to identify, based on the mapping, two interleaved locations (in a 3-rank environment) corresponding to the rank-agnostic location in memory space (step 205).

In some implementations, there may be a 1:1 correspondence between addresses in system memory space and the addresses in memory module space before any interleaving is taken into consideration. For example, a first location in system memory space would correspond directly to a second location in the physical layout of memory.

With interleaving, the correspondence between memory space and the physical layout of memory locations becomes staggered. For example, a first location in system memory space (e.g. a block of addresses) is interleaved across two different ranks of physical memory. The simple 1:1 correspondence is therefore lost. Rather, mapping 101 provides a map of sorts for controller 101 to arrive at the interleaved physical locations for a given location in system memory space. For example, in the absence of interleaving, two consecutive addresses in system memory space would map to two consecutive addresses in physical memory. With two-way interleaving in a two (or four) rank environment, two (or four) consecutive addresses in system memory space would map to a single physical address in physical memory, but at two (or four) different ranks, and so on for the remainder of addresses.

In the case of two-way interleaving in power-of-two rank environments, this relationship would hold for all of the addresses in system memory space. In the three-rank environments contemplated herein, offsets are utilized to subdivide three ranks into six subdivisions of the three ranks. In addition, system memory space is sub-divided into three ranges. Each range of addresses in system memory space is allocated to two different ranks and at an offset within each rank. Two-thirds of the ranges have offsets into their respective ranks that are the same for each rank in the pair, while one-third of the ranges have offsets into their respective rank pair(s) that differ. This allows the three ranges to be fully interleaved across the six subdivisions of the three ranks of memory. This provides an advance in speed and efficiency over prior-art techniques for two-way interleaving in three-rank environments where two of three ranks were utilized fully for interleaving, but one of three would contain no interleaved data.

Figure 2:
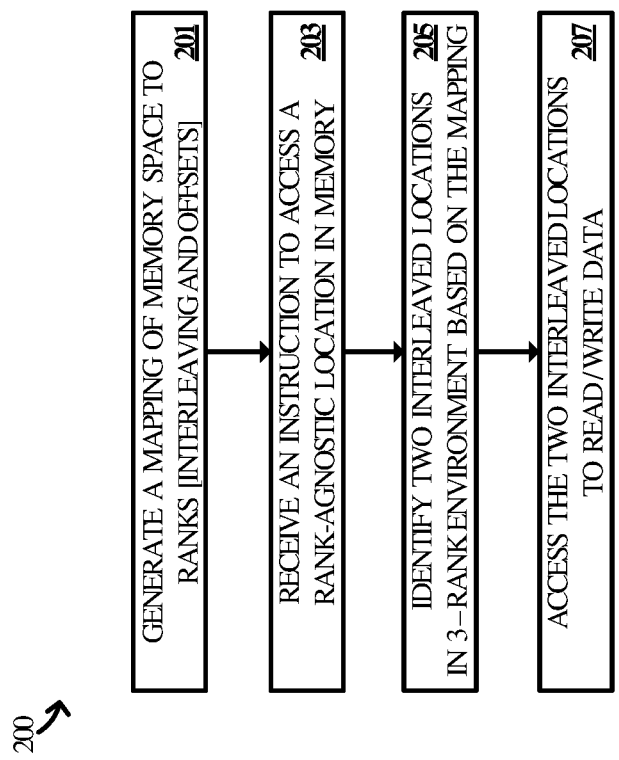
FIG. 2 illustrates an interleaving process in an implementation.

Still referring to FIG. 2, controller 101 proceeds to cause the two interleaved locations to be accessed such that data may be read from or written to the locations (step 207). This may be accomplished by, for example, enabling and/or disabling control lines on bus 115 such that data can flow to or from the two interleaved locations.

Figure 3:
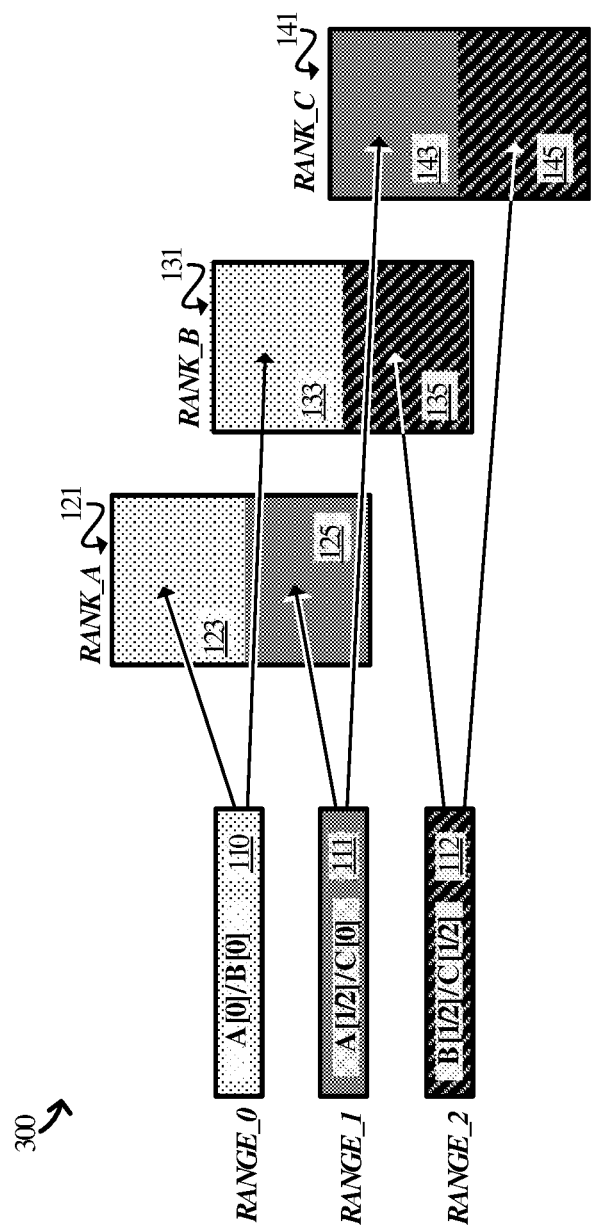
FIG. 3 illustrates a supplemental view of the operational architecture of FIG. 1.

FIG. 3 illustrates a supplemental view 300 of portions of operational architecture 100 in an exemplary application of interleaving process 200. In supplemental view 300, range 110 has been mapped to subdivision 123 of rank 121 and subdivision 133 of rank 131 by virtue of the zero-offset indicated for both ranks. Range 111 has been mapped to subdivision 125 of rank 121 and subdivision 143 of rank 141 by virtue of the one-half and zero offsets indicated respectively. Lastly, range 112 has been mapped to subdivision 135 of rank 131 and subdivision 145 of rank 141 by virtue of the one-half offsets indicate for both ranks.

Figure 4:
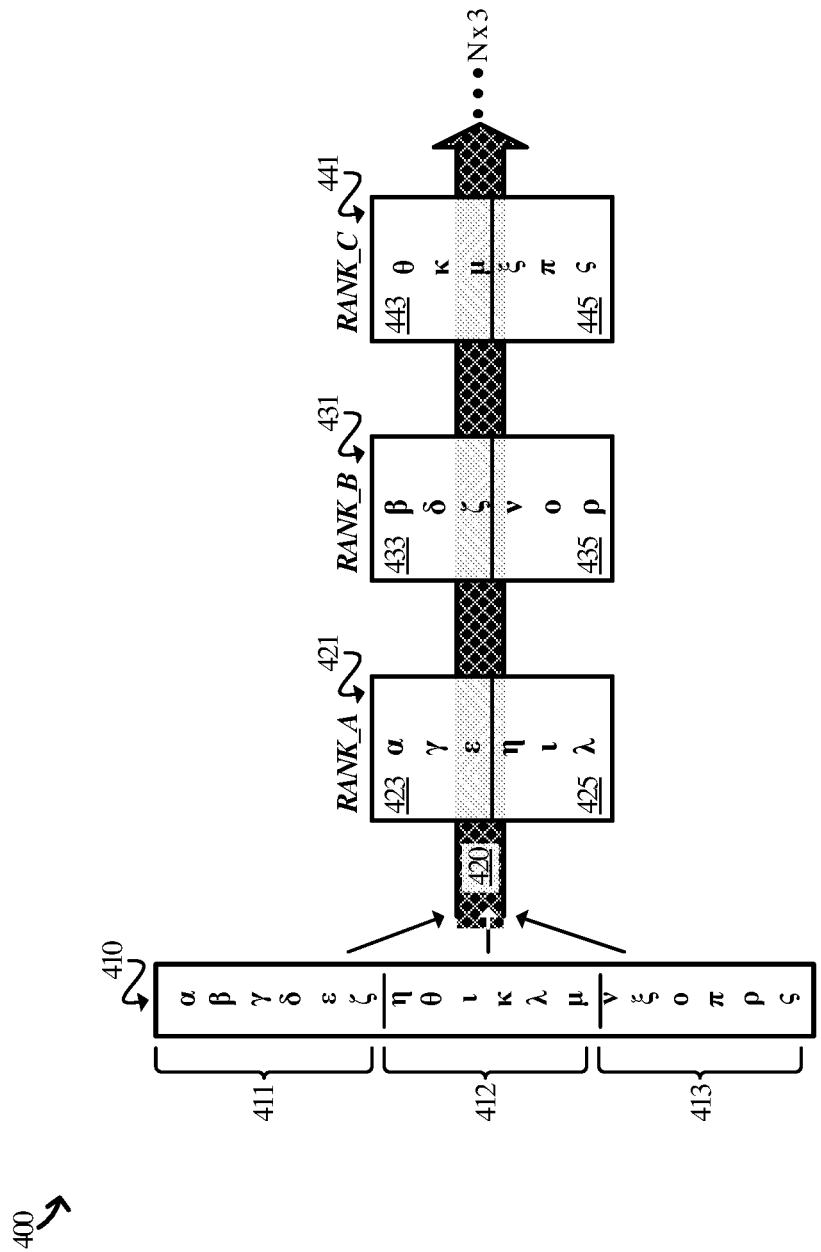
FIG. 4 illustrates an operational scenario in an implementation.

FIG. 4 illustrates an operational scenario 400 to further demonstrate various aspects of the enhanced interleaving proposed herein. Operational scenario 400 represents the two-way interleaving of data allocated to system memory space 410 across three ranks of physical memory, represented by rank 421, 431, and 441. A mapping 420 controls or directs the interleaving of three ranges of address space across six subdivisions of the three ranks. The three address ranges are represented by range 411, range 412, and range 413. The six subdivisions are represented by subdivision 423 and subdivision 425 of rank 421, subdivision 433 and subdivision 435 of rank 431, and subdivision 443 and subdivision 445 of rank 441.

The mapping 420 directs the data allocated to contiguous addresses in system memory space 410 to be interleaved across subdivisions of two ranks per range of addresses. The data comprises contiguous data represented symbolically for exemplary purposes. Range 411 maps to subdivision 423 of rank 421 and subdivision 433 of rank 431; range 412 maps to subdivision 425 of rank 421 and subdivision 433 of rank 441; and range 413 maps to subdivision 435 of rank 431 and subdivision 445 of rank 441. It may be appreciated that the offsets into subdivisions 423 and 433 are the same with respect to each other, the offsets into subdivision 425 and 443 differ with respect to each other, and the offsets into subdivisions 435 and 445 are the same with respect to each other (although they differ relative to those of subdivision 423 and subdivision 433).

Figure 5:
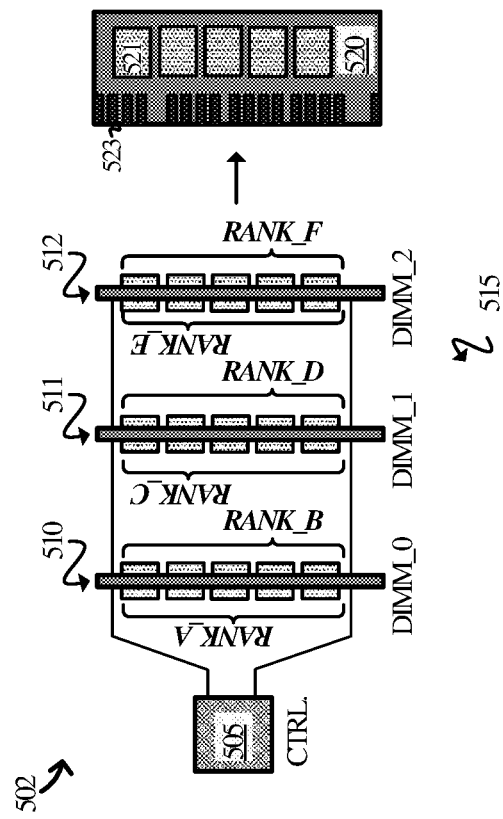
FIG. 5 illustrates several views of an operational environment in which the various architectures, processes, scenarios, and other aspects of two-way interleaving in three-rank environments discussed herein may be implemented.
Figure 5:
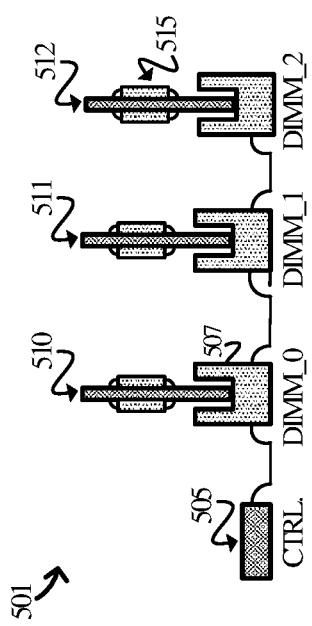

FIG. 5 illustrates two views of an operational environment in an implementation of enhanced interleaving. View 501 presents a side view of the operational environment, while view 502 presents a top-down view. The operational environment includes a controller 505 and various memory modules represented by memory module 510, memory module 511, and memory module 512. Examples of memory modules 510-512 include dual in-line memory modules (DIMM), single in-line memory modules (SIMM), and any other type of random-access memory (RAM) module. Each memory module may include one or more independent ranks, and each rank comprises a set of memory devices (e.g. DRAM devices) that operate in unison, of which memory device 515 is representative. Internal to each memory device are one or more independent banks comprised of memory arrays.

Package pins connect the memory devices to printed circuit board material which is connected via edge connectors 507 to bus traces. View 502 includes an example of a printed circuit board 520 that holds a set 521 of memory devices. The printed circuit board 520 includes pins 523 that establish a connection through edge connectors 507.

Controller 505 may be initialized during boot-up to perform two-way interleaving across 3n-number of ranks which, in this case, equals six. View 502 illustrates an arrangement of a 3n-number of ranks in the operational environment. In view 502, rank_a is defined as the set of memory devices on one side of memory module 510, while rank_b is defined as the set of memory devices on the other side of memory module 510. Rank_c and rank_d are defined as the sets of memory devices on either side of memory module 510, while rank_e and rankjare the sets of memory devices on either side of memory module 512 respectively.

Controller 505 employs an interleaving process (e.g. interleaving process 200) to efficiently write data to—and read data from—memory modules 510-512. While six ranks are illustrated, it may be appreciated that the concepts described herein could be scaled down to three ranks or up to any 3n-numbers of ranks (e.g. 9, 12, and so on). The concepts also apply to four-way interleaving It may be further appreciated that single in-line memory modules may be employed instead of—or in addition to—the dual in-line memory modules illustrated in FIG. 5.

The enhanced interleaving techniques disclosed herein may be implemented in the context of any computing device, examples of which include, but are not limited to, server computers, desktop computers, laptop computers, tablet computers, mobile phones, watches and other wearable devices, and Internet of Things (IoT) devices.

An exemplary computing device includes, but is not limited to, a processing system, a storage system, software, a communication interface system, and a user interface system (optional). The processing system is operatively coupled with the storage system, the communication interface system, and the user interface system. The memory controllers disclosed herein may be implemented in the context of the processing system (e.g. CPU) or separately within an exemplary computing device.

An exemplary memory controller includes processing circuitry and non-transitory computer readable storage media readable by the processing circuitry and capable of storing firmware and associated parameters. The computer readable storage media may include volatile and nonvolatile media, removable and non-removable media, or any other method or technology for storage of information, such as computer readable instructions, data structures, program modules, or other data. Examples of the storage media include random access memory, read only memory, or any other suitable storage media. In no case is the computer readable storage media a propagated signal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
    a three-rank environment comprising a plurality of memory modules, wherein the plurality of memory modules comprises a quantity of memory modules equal to a non-power of two number;
    a memory controller operatively coupled with the plurality of memory modules and configured to at least:
        load a mapping of target ranges in system memory space interleaved two-ways across locations in the three-rank environment, wherein:
            the target ranges comprise three ranges of rank-agnostic addresses sized equally with respect to each other,
            for each range of the target ranges, the mapping comprises a two-way interleaving of the range across two ranks of the three-rank environment and offsets from base locations in the two ranks, and
            the offsets differ relative to each other for only one range of the three ranges of rank-agnostic addresses;
        receive an instruction to read data at a rank-agnostic location in the system memory space;
        using the mapping, map the rank-agnostic location to two interleaved locations offset different amounts from the base location in each of the two ranks mapped to the range of the rank-agnostic location; and
        read the data at the two interleaved locations.

2. The computing apparatus of claim 1 wherein the non-power of two number comprises one of three, six, nine, and twelve.

3. The computing apparatus of claim 1 wherein the offsets match each other for two ranges of the three ranges of rank-agnostic addresses.

4. The computing apparatus of claim 3 wherein the rank-agnostic location comprises a rank-agnostic address in the system memory space.

5. The computing apparatus of claim 4 wherein the two interleaved locations comprise rank-aware addresses in memory module space.

6. The computing apparatus of claim 1 wherein the plurality of memory modules comprises dynamic random-access memory (DRAM).

7. A method of operating a memory control unit to perform two-way interleaving in a three-rank environment, the method comprising:
    receiving an instruction to access a rank-agnostic location within a range of rank-agnostic addresses in system memory space;
    accessing a mapping of target ranges in system memory space interleaved two-ways across the three-rank environment, wherein for each range of the target ranges, the mapping comprises a two-way interleaving of the range across two ranks of the three-rank environment and offsets from base locations in the two ranks;
    identifying two interleaved locations in the three-rank environment based on the mapping, wherein the offsets from the base location in each of the two ranks mapped to the range of the rank-agnostic location differ; and accessing the two interleaved locations in the three-rank environment to read or write data at the rank-agnostic locations;

wherein the offsets differ relative to each other for only one range of the three ranges of rank-agnostic addresses, the target ranges comprise three ranges of rank-agnostic addresses sized equally with respect to each other, and the three-rank environment includes a quantity of memory modules equal to a non-power of two number.

8. The method of claim 7 wherein the non-power of two number comprises one of three, six, nine, and twelve.

9. The method of claim 7 wherein the system memory space interleaved two-ways across the three-rank environment comprises DRAM.

10. The method of claim 7 wherein the offsets match each other for two ranges of the three ranges of rank-agnostic addresses.

11. The method of claim 10 wherein the rank-agnostic location comprises a rank-agnostic address in the system memory space.

12. The method of claim 11 wherein the two interleaved locations comprise rank-aware addresses in memory module space.

13. A computing apparatus comprising:
a memory sub-system comprising a three-rank environment that includes a quantity of memory modules equal to a non-power of two number;
one or more processors configured to read and write data to and from the memory sub-system; and
a basic input/output system (BIOS) configured to initialize the computing apparatus to perform two-way interleaving of the data across the three-rank environment by:
loading a mapping of target ranges in system memory space interleaved two-ways across locations in the three-rank environment, wherein:
the target ranges comprise three ranges of rank-agnostic addresses sized equally with respect to each other,
for each range of the target ranges, the mapping comprises a two-way interleaving of the range across two ranks of the three-rank environment and offsets from base locations in the two ranks, and
the offsets differ relative to each other for only one range of the three ranges of rank-agnostic addresses;
receiving an instruction to read the data at a rank-agnostic location in the system memory space;
using the mapping, mapping the rank-agnostic location to two interleaved locations offset different amounts from the base location in each of the two ranks mapped to the range of the rank-agnostic location; and
reading the data at the two interleaved locations.

14. The computing apparatus of claim 13 wherein the two interleaved locations comprise rank-aware addresses in memory module space.

15. The computing apparatus of claim 13 wherein the non-power of two number comprises one of three, six, nine, and twelve.

16. The computing apparatus of claim 15 wherein the offsets match each other for two ranges of the three ranges of rank-agnostic addresses.

17. The computing apparatus of claim 13 wherein:
the rank-agnostic location comprises a rank-agnostic address in system memory space.

18. The computing apparatus of claim 13 wherein the two interleaved locations comprise rank-aware addresses in memory module space.

19. The computing apparatus of claim 13 wherein the three-rank environment comprises memory modules comprising DRAM.

* * * * *